US008476334B2

(12) United States Patent
Illsley et al.

(10) Patent No.: US 8,476,334 B2
(45) Date of Patent: Jul. 2, 2013

(54) ACRYLATED POLYAMIDES

(75) Inventors: Derek Ronald Illsley, Kent (GB); Martin John Thompson, Kent (GB); Sean Phillip Francis Mayers, Kent (GB); Douglas Frederick Pavey, Kent (GB)

(73) Assignee: Sun Chemical Corporation, Parsippany, NJ (US)

( * ) Notice: Subject to any disclaimer, the term of this patent is extended or adjusted under 35 U.S.C. 154(b) by 774 days.

(21) Appl. No.: 11/721,296

(22) PCT Filed: Dec. 2, 2005

(86) PCT No.: PCT/IB2005/004143
§ 371 (c)(1),
(2), (4) Date: Jul. 21, 2009

(87) PCT Pub. No.: WO2006/067639
PCT Pub. Date: Jun. 29, 2006

(65) Prior Publication Data
US 2009/0306242 A1  Dec. 10, 2009

(30) Foreign Application Priority Data

Dec. 10, 2004 (GB) .................................. 0427129.2

(51) Int. Cl.
*C08F 2/46* (2006.01)
(52) U.S. Cl.
USPC ............. 522/176; 522/74; 522/173; 522/182; 522/150; 522/153; 522/152; 528/332; 528/335; 528/345; 528/342; 528/350; 523/160; 523/161; 106/31.13; 106/31.6
(58) Field of Classification Search
USPC .. 522/176, 173, 182, 150, 152, 153; 528/332, 528/335, 345, 342, 350; 523/160, 162; 106/31.13, 31.6
See application file for complete search history.

(56) References Cited

U.S. PATENT DOCUMENTS

| 4,987,160 | A | | 1/1991 | Frihart et al. |
| 5,109,053 | A | * | 4/1992 | Smith et al. .................. 524/514 |
| 5,155,177 | A | * | 10/1992 | Frihart ....................... 525/420.5 |
| 5,565,246 | A | * | 10/1996 | Hyde ............................. 427/504 |
| 5,786,086 | A | * | 7/1998 | Frihart et al. ................ 428/379 |
| 6,455,633 | B1 | * | 9/2002 | Jones ........................... 525/54.4 |
| 6,809,127 | B2 | * | 10/2004 | Dones et al. .................. 522/176 |
| 7,338,986 | B2 | * | 3/2008 | Ananthachar et al. ........ 522/178 |
| 2003/0073756 | A1 | * | 4/2003 | Dones et al. .................. 522/164 |
| 2005/0107509 | A1 | * | 5/2005 | Ananthachar et al. ........ 524/457 |
| 2008/0221234 | A1 | * | 9/2008 | Illsley et al. .................... 522/88 |
| 2009/0099278 | A1 | * | 4/2009 | Carroy et al. ................. 522/164 |
| 2009/0099279 | A1 | * | 4/2009 | Carroy et al. ................. 522/173 |
| 2009/0099280 | A1 | * | 4/2009 | Carroy ......................... 522/173 |

OTHER PUBLICATIONS

International Search Report and Written Opinion of the International Searching Authority, issued for corresponding PCT Application PCT/IB05/04143, Jun. 7, 2006.

* cited by examiner

*Primary Examiner* — Sanza McClendon
(74) *Attorney, Agent, or Firm* — Kramer Levin Naftalis & Frankel LLP

(57) ABSTRACT

A radiation-curable acrylate-modified aminoamide resin which is the Michael addition product of an aminoamide thermoplastic polymer derived from a polymerised unsaturated fatty acid with a polyol ester having at least three (meth) acrylate ester groups, the aminoamide thermoplastic polymer having an amine number of from 40 to 60 mgKOH/g, the ratio of the initial (meth) acrylate groups of the polyol ester to the initial amino functional groups of the aminoamide polymer being at least 4:1, is liquid at 25° C., and is useful as the resin component of various types of energy-curable coating composition, including inks, varnishes and lacquers, especially lithographic inks.

18 Claims, No Drawings

ACRYLATED POLYAMIDES

CROSS REFERENCE TO RELATED APPLICATIONS

This application is the United States national stage filing of the corresponding international application number PCT/IB2005/004143 filed on Jun. 30, 2005, which claims priority to and benefit of Great Britain Application No. 0427129.2 filed 10 Dec. 2004, each of which is hereby incorporated herein by reference.

The present invention relates to a series of new acrylate-modified polyamide resins and provides processes for their preparation and methods and compositions using them, especially for use in printing inks, and particularly for inks printable by offset lithography.

EP 0 381 354 B1 describes and claims a series of aminoamide acrylate polymers which are curable by actinic radiation and which are said to be useful as hot melt adhesives. Although the specification states that the aminoamide acrylate polymers—the subject of the invention—are potentially of use for a wide range of other applications, including in varnishes, lacquers and inks, in reality, given the properties that the polymers necessarily have in order to be good hot melt adhesives, it is clear that they would never function as the resin component of a normally formulated printing ink. Specifically, the polymers of EP 0 381 354 B1 are solid with a very high molecular weight, which gives a low acrylate density, making them unsuitable as a sole vehicle in a lithographic printing ink since the cure would not be sufficient.

U.S. Pat. No. 6,809,127 describes and claims a liquid radiation-curable composition comprising the reaction product of an amine-terminated (poly)aminoamide and a mono-(meth)acrylate or poly-(meth)acrylate. These compositions, like those of EP 0 381 354 B1, are curable by energy, such as an electron beam or ultraviolet radiation, and are said to be useful as adhesives, although they differ from those of EP 0 381 354 B1 in being liquid at room temperature. As with the compositions of EP 0 381 354 B1, since these polymers are useful as adhesives, they necessarily would not function well as inks, especially lithographic inks. In particular, the aminoamide of U.S. Pat. No. 6,809,127 is acrylated with mono or difunctional acrylates, giving poor cure when used as a sole vehicle in a lithographic printing ink. Furthermore, the acrylates used in the Examples of U.S. Pat. No. 6,809,127 are chosen to provide compositions having good adhesion, but, because the resulting aminoamide acrylate polymers have pendant —OH groups, inks including these polymers would mix with water to such an extent that it would not be possible to achieve the correct ink-water balance in lithographic printing.

We have now surprisingly found that, by somewhat modifying the properties of the polymers described in EP 0 381 354 B1, it is possible to prepare resins which can form the basis for inks, varnishes and lacquers which can be applied to a substrate by printing, especially lithographic printing.

Thus, the present invention consists in a radiation-curable acrylate-modified aminoamide resin which is the Michael addition product of an aminoamide thermoplastic polymer derived from a polymerised unsaturated fatty acid with a polyol ester having at least three (meth)acrylate ester groups, the aminoamide thermoplastic polymer having an anine number of from 40 to 60 mgKOH/g, the ratio of the initial (meth)acrylate groups of the polyol ester to the initial amino functional groups of the aminoamide polymer being at least 4:1, and the resin being liquid at 25° C.

The aminoamide polymer, which is the starting material for the preparation of the resin of the present invention, is the reaction product of a polycarboxylic, preferably dicarboxylic, acid, with a polyamine, preferably a diamine, more preferably the aminoamide polymer is a reaction product of a polymerised unsaturated fatty acid with a diamine.

Examples of polycarboxylic acids which may be employed include: dibasic aliphatic acids having from 2 to 20 carbon atoms, such as oxalic, malonic, succinic, glutaric, adipic, pimelic, suberic, azelaic, sebacic, dodecanoic, and icosanoic acids; dibasic aromatic acids, such as isophthalic acid; and dimer acid, of which dimer acid is preferred. If desired, a mixture of any two or more of these acids may be employed, preferably a mixture of dimer acid and one or more of the other acids.

Dimer acid is, as is well known to those skilled in the field of resins, a polymeric fatty acid, or, more commonly, mixture of polymeric fatty acids, prepared by polymerisation of unsaturated fatty acids, commonly obtained from tall oil. Although the major part of such dimer acids is composed of one or more dibasic acids, they typically also contain small amounts of monobasic acids and small amounts of tri- and higher basic acids. If desired, the polymerised product may be separated into its components, but, more usually, the mixture of acids obtained from the polymerisation is used, as is. Hydrogenated dimer acids may also be employed.

In general, the diamine is preferably an aliphatic, cycloaliphatic or aromatic diamine having from 2 to 36 carbon atoms. Examples of such diamines which may be employed include: aliphatic diamines having from 1 to 36 carbon atoms, such as methylenediamine, ethylenediamine, trimethylenediamine, hexamethylenediamine, methylpentamethylenediamine and polyether diamines; aromatic diamines having from 6 to 20 carbon atoms, such as toluenediamine, p,p'-diaminodiphenylmethane, and xylenediamine; cycloaliphatic diamines, such as diaminocyclohexane; and heterocyclic diamines, such as piperazine, 4,4'-dipiperidinyl, and aminoethylpiperazine. In addition, tri- and higher amines may be used, but preferably only in combination with one or more diamines and preferably in sufficiently small amounts as to prevent or minimise premature gelation. Examples of such polyamines include diethylenetriamine, triethylenetetramine, tetraethylenepentamine and bishexamethylenetriamine.

Of the diamines, we especially prefer to use piperazine, and a polyamide prepared by the reaction of dimer acid with piperazine is most preferred.

The reaction between a polycarboxylic acid and a polyamine is well known and may be carried out under well known conditions. The reaction is preferably carried out in the presence of a solvent suitable for forming an azeotrope with water. Otherwise, the nature of the solvent is not critical to the invention, provided that it has no adverse effect on the reaction or on the reagents involved. Examples of suitable solvents include aromatic hydrocarbons, such as xylene, toluene or benzene. There is equally no particular restriction on the reaction temperature; however, the reaction is preferably carried out at a temperature greater than 100° C., so as to remove the water formed during the reaction.

The polyamide so prepared should have an amine number of from 40 to 60 mgKOH/g, and the amounts of polyamine and polycarboxylic acid used should be so chosen as to achieve a product having such an amine number. If necessary, the progress of the reaction may be monitored, as is well known in the art, so as to enable the reaction to be terminated when the required amine number has been achieved. Preferably the aminoamide thermoplastic polymer has an amine number of from 45 to 55 mgKOH/g, more preferably about 50 mgKOH/g.

This polyamide is then reacted with a polyol ester having at least three (meth)acrylate ester groups. The expression "(meth)acrylate" is used herein to mean "acrylate or methacrylate or a mixture thereof". The polyol ester should have at least 3, and preferably from 3 to 6 such (meth)acrylate ester groups. More preferably the polyol ester is an acrylate with a functionality of 3 or 4.

Preferably the polyol ester is an acrylate or methacrylate of a $C_2$-$C_{20}$ aliphatic or cycloaliphatic polyol.

Examples of suitable polyol esters include: glycerol triacrylate, glycerol trimethacrylate, sorbitol triacrylate, sorbitol trimethacrylate, trimethylolethane triacrylate, trimethylolethane trimethacrylate, trimethylolpropane triacrylate, dimethylolpropane tetraacrylate, dimethylolpropane tetramethacrylate, trimethylolpropane trimethacrylate, ethoxylated trimethylolpropane triacrylate, ethoxylated trimethylolpropane trimethacrylate, glycerol propoxylate triacrylate, glycerol propoxylate trimethacrylate, pentaerythritol triacrylate, pentaerythritol trimethacrylate, pentaerythritol tetraacrylate, pentaerythritol tetramethacrylate, dipentaerythritol hexaacrylate, dipentaerythritol hexamethacrylate, ethoxylated pentaerythritol tetraacrylate, propoxylated pentaerythritol tetraacrylate, sucrose pentaacrylate, sucrose pentamethacrylate, sucrose tetraacrylate, sucrose tetramethacrylate, sucrose triacrylate and sucrose trimethacrylate, of which glycerol propoxylate triacrylate is most preferred.

The Michael reaction between the polyamide and the polyol ester is a well known reaction and may be carried out under well known conditions. The reaction will often take place readily at ambient temperature. However, if desired, somewhat elevated temperatures may be employed, for example, a temperature from 20 to 100, more preferably from 20 to 70° C.

The polyol ester is preferably employed in an amount in excess of the simple stoichiometric amount needed to react with all of the free amine groups in the polyamide, so that unreacted acrylate groups are left in the reaction mixture.

The ratio of the initial (meth)acrylate groups of the polyol ester to the initial amino functional groups of the aminoamide polymer is at least 4:1. We prefer that this ratio should be at least 8:1, more preferably greater than 8:1 and no more than 30:1, still more preferably greater than 8:1 and no more than 20:1, and most preferably greater than 8:1 and no more than 15:1.

The process for preparing the resin of the present invention is preferably carried out as a "one pot" process, i.e. without intermediate isolation of the product of the first step (the reaction of the polymerised fatty acid with the polyamine to prepare the aminoamide) before the aminoamide is reacted with the polyol ester.

Thus, in a preferred embodiment, the present invention consists in a process for preparing a resin of the present invention, in which:
(a) a polymerised unsaturated fatty acid and a polyamine are reacted to prepare an aminoamide thermoplastic polymer having an amine number of from 40 to 60 mgKOH/g; and
(b) without isolation after step (a), the aminoamide thermoplastic polymer is subjected to a Michael addition with a polyol ester having at least three (meth)acrylate ester groups, the ratio of the initial (meth)acrylate groups of the polyol ester to the initial amino functional groups of the aminoamide polymer being at least 4:1, to prepare a resin which is liquid at 25° C.

The present invention also provides an energy-curable coating composition comprising a cross-linkable component and a photoinitiator, wherein the cross-linkable component comprises at least one resin of the present invention.

Such as coating composition may be an ink, preferably a printing ink, a varnish, a lacquer or any other known form of coating composition curable by incident energy. In particular, the composition is preferably a printing ink for offset lithography.

The energy curable composition of the present invention comprises at least a photoinitiator and a polymerisable resin of the present invention. In addition, it may contain any one or more of other well known materials which are commonly incorporated into such compositions to provide particular desired properties either in the curable composition or in the final cured product.

Non-limiting examples of such other components are as follows:

Monomers and Oligomers

The composition may, if desired, contain other radiation-curable monomers and/or oligomers. Examples of suitable acrylate oligomers include aliphatic or aromatic urethane acrylates, polyether acrylates, polyester acrylates and epoxy acrylates (such as bisphenol A epoxy acrylate). Examples of suitable acrylate monomers include hexanediol diacrylate, trimethylolpropane triacrylate, di-trimethylolpropane tetraacrylate, di-pentaerythritol pentaacrylate, polyether acrylates, such as ethoxylated trimethylol propane triacrylate, glycerol propoxylate triacrylate, ethoxylated pentaerythritol tetraacrylate, and epoxy acrylates such as dianol diacrylate (=the diacrylate of 2,2-bis[4-(2-hydroxyethoxy)phenyl]propane, Ebecryl 150 from UCB) and glycol diacrylates such as tripropylene glycol diacrylate.

Initiators

The composition of the present invention will contain, in addition to the resin of the present invention, a photoinitiator. Such initiators are well known in the art, and there is no particular restriction on the choice of initiator for use in the present invention.

In general, a blend of several photoinitiators and an anime synergist are preferably used to achieve the desired balance of product properties. The photoinitiators may be of either the cleavage or hydrogen abstraction type and are preferably selected from the following photoinitiator classes: benzophenones, thioxanthones, hydroxyalkylphenones, aminoalkylphenones, anthraquinones, acyl phosphine oxides, bis-acyl phosphine oxides, benzil ketals, benzoin ethers, acetophenones, beta ketosulphones, oxime esters and phenyl glyoxic acid esters. The amine synergists are preferably selected from the classes of aliphatic amines, aminoacrylates or esters of 4-dimethylaminobenzoic acid. Sensitisers such as Michler's ketone or its analogues may also be used.

Further examples of photoinitiators, synergists and sensitisers can be found in standard textbooks such as "Chemistry & Technology of UV & EB Formulation for Coatings, Inks & Paints", Volume III, "Photoinitiators for Free Radical Cationic and Anionic Polymerisation", $2^{nd}$ edition, by J. V. Crivello & K. Dietliker, edited by G. Bradley and published in 1998 by John Wiley & Sons in association with SITA Technology Limited; and "Exploring the Science, Technology and Applications of UV and EB Curing", R. S. Davidson, SITA Technology Ltd., London, 1999, the disclosures of which are incorporated herein by reference.

Pigments

In its broadest sense, the present invention provides an energy-, e.g. radiation-curable composition, which may be, for example, a printing ink or varnish composition. That is to say, a composition which is curable by the application of suitable radiation such as ultra-violet (UV) radiation or electron-beam radiation. Such a composition may be only a substantially colourless curable varnish or a substantially colourless radiation-curable base to which a colorant may be added. In the context of the present invention, the term 'colorant' covers both materials which endow an actual visual colour and/or another optical property such as fluorescence. Colorants are typically included in amounts of about 20% of total colorant(s) by weight of the total composition.

Broadly speaking, colorants may be considered as falling into two classes, namely dyes, which are substantially soluble in the ink composition, and pigments, which are dispersed in the ink composition in the form of fine particles, if necessary with the aid of a suitable dispersant. Pigments may be selected from a wide range of classes, for example, Pigment Red 57:1, Pigment Red 52:2, Pigment Red 48:2, Pigment Blue 15:3, Pigment Green 7, Pigment Yellow 83, Pigment Yellow 13, Pigment White 6, Pigment Black 7. A non-exhaustive list of examples of such pigments include the following from the Irgalite range ex CIBA: Rubine L4, Bordeaux CM, Red 2BP, Blue LG, Green GLN, Yellow B3R and yellow LBG; as well as Tioxide RHD6 (ex Tioxide) and Special Black 250 (ex Degussa). Other examples of suitable pigments are given in "Printing Ink Manual", fourth edition, Leach R. H. et al. (eds.), Van Nostrand Reinhold, Wokingham, (1988), the disclosure of which is incorporated herein by reference.

Other Additives

Printing ink and varnish compositions according to the present invention optionally may also comprise one or more minor ingredients, for example, surfactants, levelling additives, photoinitiator stabilisers, wetting agents and pigment stabilisers. The latter may for example be of polyester, polyurethane or polyacrylate types, especially in the form of high molecular weight block co-polymers, and would typically be incorporated at from 2.5% to 100% by weight of the pigment. Suitable examples are Disperbyk 161 or 162 (ex BYK Chemie) or Solsperse ex Zeneca. Suitable photoinitiator stabilisers include those disclosed in EP-A-0 465 039.

Suitable surfactants are preferably of the non-ionic type, for example Fluorad FC430 (ex 3M Corp.). Such surfactants (when present) are preferably included in an amount of 0.1% to 10% by weight of the total composition.

The amount of the acrylated polyamide of the coating composition of the present invention may vary over a wide range, as is well known in the art. In general terms, for printing ink compositions, we prefer that the amount should be between 15 and 70%, more preferably 20 to 60%, and most preferably 25-45%. For varnishes, the amount should be between 15 and 95%, preferably 15 to 50%, most preferably 20 to 40%

The application and curing of the compositions of the present invention may be carried out using techniques well known to those skilled in the art, for example, as described in "printing Ink Manual", fourth edition, referred to above.

The invention is further illustrated by the following non-limiting Examples.

EXAMPLE 1

Preparation of Acrylated Polyamide Resin

Dimer acid (Pripol 1013 ex Uniqema, 82.73 g, 0.295 equivalents) and piperazine (16.5 g, 0.384 equivalents) were charged to a reaction vessel with sufficient xylene for azeotropic distillation and heated to 120° C. with a nitrogen sparge. The reaction was held at 120° C. until the amine was fixed, and the mixture was then heated to 190° C. and held until all water of reaction had been removed. A sample of the product was titrated with HCl to bromocresol green end-point to show an amine value of 50 mgKOH/g. The reaction vessel was then cooled to 60° C. and glycerol propoxylate triacrylate (OTA 480 ex UCB 150.52 g, 0.94 equivalents) added with a small quantity of inhibitor (BHT, 0.25 g). The reaction was held at 60° C. until the Michael addition had finished. The product was a yellow liquid of medium viscosity.

EXAMPLE 2

Preparation of Acrylated Polyamide Resin

Dimer acid (Pripol 1017 ex Uniqema 131.8 g, 0.47 equivalents) and piperazine (27.9, 0.65 equivalents) were charged to a reaction vessel with sufficient xylene for azeotropic distillation and heated to 120° C. with a nitrogen sparge. The reaction was held at 120° C. until the amine was fixed, and the mixture was then heated to 190° C. and held until all water of reaction had been removed. A sample of the product was titrated with HCl to bromocresol green end-point to show an amine value of 50 mgKOH/g. The reaction vessel was then cooled to 60° C. and glycerol propoxylate triacrylate (OTA 480 ex UCB 239.9 g, 1.5 equivalents) added with a small quantity of inhibitor (BHT, 0.4 g). The reaction was held at 60° C. until the Michael addition had finished. The product was a yellow liquid of medium viscosity.

EXAMPLE 3

Preparation of Magenta, Cyan and Yellow Inks

Standard UV magenta, cyan and yellow inks were made up with polyester acrylates (50 g Ebecryl 657 and 50 g Ebecryl 870, both ex UCB), epoxy acrylate (CN104 ex Sartomer 10 g), acrylated monomers (GPTA, OTA 480 ex UCB 10 g and dianol diacrylate 20 g), pigment (36 g), talc (4 g), wax (2 g) and photoinitiator (18 g made up of 25% benzophenone, 25% isopropylthioxanthone, and 50% of 2-ethylhexyl-4-dimethylaminobenzoate) on a 3 roll mill.

The pigments used were:
For the magenta ink: Litho rubine pigment (Irgalite SMA-SG ex Ciba Geigy)
For the cyan ink: Phthalocyanine blue pigment (Sunfast blue ex Sun Chemical)
For the yellow ink: Azo yellow pigment (Irgalite yellow LBF ex Ciba Geigy)

A second series of three inks was prepared in the same manner with all the acrylated oligomer components (110 g) replaced by a polyamide acrylate made according to Example 1. All three inks of this second series were found to have equivalent colour strength and cure compared with the standard inks, but improved flow as measured by visual inspection on a flow plate.

EXAMPLE 4

Varnishes

The polyamide acrylates from Examples 5 and 20 of U.S. Pat. No. 6,809,127 (Cognis) were prepared in the laboratory along with Example 1, above.

All three polyamide acrylates were diluted to 65% with glycerol propoxylate triacrylate (GPTA, OTA 480 ex UCB). 89 parts of polyamide acrylate were added to benzophenone (7 parts) and N-methyldiethanolamine (4 parts) and applied to coated board with a 0 K-bar (3 μm film) and passed under a 120 W/cm medium pressure mercury arc lamp at 80 m/min. The number of passes required to achieve surface cure (measured by thumb twist) and the resistance to methyl ethyl ketone (MEK) were recorded and are reported in Table 1.

TABLE 1

|  | Passes to surface cure | MEK resistance |
|---|---|---|
| Example 1 | 3 | >100 rubs |
| Cognis example 5 | 5 | 16 rubs |
| Cognis example 20 | 4 | 5 rubs |

EXAMPLE 5

Comparison with Cognis Polyamide Acrylate from U.S. Pat. No. 6,809,127

A standard UV cyan ink was made with polyamide acrylate from Example 1 above (110 g), acrylated monomers (GPTA, OTA 480 ex UCB 10 g and dianol diacrylate 20 g), phthalocyanine blue pigment (Sunfast blue ex Sun Chemical 36 g), talc (4 g), wax (2 g) and photoinitiator (18 g) on a 3 roll mill. A second ink was prepared in the same manner with the polyamide acrylate (110 g) replaced by a polyamide acrylate made according to Example 5 of the Cognis patent (U.S. Pat. No. 6,809,127). A 2 μm film of ink was applied to card and passed under a 120 W/cm medium pressure mercury arc lamp at 100 metres/minute. The number of passes required to achieve surface and through cure were noted and are reported in Table 2.

TABLE 2

|  | Ink with polyamide from Example 1 | Ink with polyamide from Cognis patent |
|---|---|---|
| Surface cure | 1 pass | 1 pass |
| Through cure | 2 passes | 7 passes |

Both inks were also evaluated for lithographic performance on a Lithotronic (Novocontrol GmbH). The ink made with the polyamide of Example 1 hereof took up 20% w/w fount solution by weight, an ideal quantity for good lithographic performance. The ink made with the polyamide from the Cognis patent took up more than 100% w/w fount solution, making it totally unsuitable for lithographic printing.

What is claimed is:

1. A printing ink comprising:
   a pigment; and
   a radiation-curable acrylate-modified aminoamide resin which is the Michael addition product of an aminoamide thermoplastic polymer derived from a polymerised unsaturated fatty acid with a polyol ester having at least three (meth)acrylate ester groups, wherein
   said printing ink is a lithographic printing ink,
   the aminoamide thermoplastic polymer has an amine number from 40 to 60 mgKOH/g,
   a ratio of initial (meth)acrylate groups of the polyol ester to initial amino functional groups of the aminoamide polymer is greater than 8:1, and
   the resin is liquid at 25° C.

2. The printing ink according to claim 1, in which the ratio of the initial (meth)acrylate groups of the polyol ester to the initial amino functional groups of the aminoamide polymer is greater than 8:1 and no more than 30:1.

3. The printing ink according to claim 2, in which the ratio of the initial (meth)acrylate groups of the polyol ester to the initial amino functional groups of the aminoamide polymer is greater than 8:1 and no more than 20:1.

4. The printing ink according to claim 3, in which the ratio of the initial (meth)acrylate groups of the polyol ester to the initial amino functional groups of the aminoamide polymer is greater than 8:1 and no more than 15:1.

5. The printing ink according to claim 1, wherein the aminoamide thermoplastic polymer has an amine number from 45 to 55 mgKOH/g.

6. The printing ink according to claim 1, wherein the aminoamide thermoplastic polymer has an amine number about 50 mgKOH/g.

7. The printing ink according to claim 1, wherein the aminoamide polymer is a reaction product of a polymerised unsaturated fatty acid with a diamine.

8. The printing ink according to claim 7, in which the polymerised unsaturated fatty acid is a dimer acid.

9. The printing ink according to claim 7, in which the diamine is an aliphatic, cycloaliphatic or aromatic diamine having from 2 to 36 carbon atoms.

10. The printing ink according to claim 9, in which the diamine is ethylenediamine, propylenediamine, trimethylenediamine, tetramethylenediamine, hexamethylenediamine, methylpentamethylenediamine, diaminocyclohexane, piperazine, 4,4'-dipiperidinyl, toluene-2,4-diamine or p,p'-diaminodiphenylmethane.

11. The printing ink according to claim 9, in which the diamine is piperazine.

12. The printing ink according to claim 1, wherein the polyol ester is an acrylate or methacrylate of a $C_2$-$C_{20}$ aliphatic or cycloaliphatic polyol.

13. The printing ink according to claim 1, wherein the polyol ester is an acrylate with a functionality of 3 or 4.

14. The printing ink according to claim 12, in which the polyol ester is glycerol triacrylate, glycerol trimethacrylate, sorbitol triacrylate, sorbitol trimethacrylate, trimethylolethane triacrylate, trimethylolethane trimethacrylate, trimethylolpropane triacrylate, dimethylolpropane tetraacrylate, dimethylolpropane tetramethacrylate, trimethylolpropane trimethacrylate, ethoxylated trimethylolpropane triacrylate, ethoxylated trimethylolpropane trimethacrylate, glycerol propoxylate triacrylate, glycerol propoxylate trimethacrylate, pentaerythritol triacrylate, pentaerythritol trimethacrylate, pentaerythritol tetraacrylate, pentaerythritol tetramethacrylate, dipentaerythritol hexaacrylate, dipentaerythritol hexamethacrylate, ethoxylated pentaerythritol tetraacrylate, propoxylated pentaerythritol tetraacrylate, sucrose pentaacrylate, sucrose pentamethacrylate, sucrose tetraacrylate, sucrose tetramethacrylate, sucrose triacrylate or sucrose trimethacrylate.

15. The printing ink according to claim 14, in which the polyol ester is glycerol propoxylate triacrylate.

16. A process for preparing the printing ink according to claim 1.

17. The printing ink according to claim 1 further comprising a cross-linkable component and a photoinitiator, wherein the cross-linkable component comprises said resin.

18. A lithographic printing process comprising:
   providing the printing ink according to claim 1;
   providing a substrate having a surface for printing; and
   applying the printing ink onto the surface of the substrate.

* * * * *